June 6, 1961  C. W. MICHATEK ET AL  2,986,979
FLASH HOLDER WITH SAFETY SWITCH
Original Filed Aug. 13, 1956

CHESTER W. MICHATEK
HAROLD L. MALONE
INVENTORS

BY R. Frank Smith

Karl T. Haramy
ATTORNEYS

United States Patent Office 2,986,979
Patented June 6, 1961

2,986,979
FLASH HOLDER WITH SAFETY SWITCH
Chester W. Michatek and Harold L. Malone, Rochester, N.Y., assignors to Eastman Kodak Company, Rochester, N.Y., a corporation of New Jersey
Original application Aug. 13, 1956, Ser. No. 603,579, now Patent No. 2,892,073, dated June 23, 1959. Divided and this application May 5, 1958, Ser. No. 733,111
2 Claims. (Cl. 95—11.5)

The present invention relates to a flash holder adapted to be attached to, and used in combination with, a camera equipped with a built-in flash synchronizer for taking flash pictures, and particularly to such a flash holder having a flash lamp circuit which is completed only when the holder is attached to the camera on which it is adapted to be used.

This application is a division of U.S. application Serial No. 603,579, filed August 13, 1956, now Patent No. 2,892,073, in the names of Chester W. Michatek and Harold L. Malone.

The primary object of the present invention is to provide a flash holder which contains a flash lamp circuit including a source of potential and a pair of electrical contacts projecting therefrom which are adapted to engage a corresponding pair of contacts on the flash synchronizer switch in the camera in a controlling relation with the flash lamp circuit in the flash holder characterized by the fact that the flash lamp circuit in the flash holder is disrupted until the flash holder is properly attached to the camera whereby there can be no accidental short circuiting of the flash lamp circuit when the holder is off the camera by reason of the contacts projecting therefrom being accidentally shorted.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which:

FIG. 1 is an exploded perspective view of a multiple flash holder constructed in accordance with a preferred embodiment of the present invention with parts of the wall of the housing broken away to show the flash lamp circuit therein and the manner of mounting the turret support spindle thereon, and showing the turret in the position it assumes just as it is about to be mounted on, or is being removed from, the housing;

Figure 1:
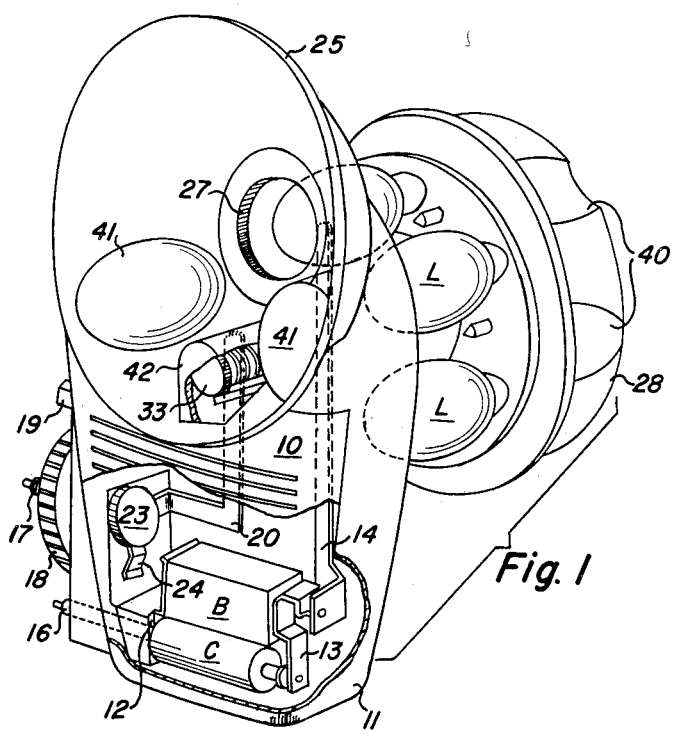
Figure 3:
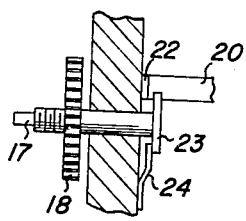
FIG. 3 is an enlarged sectional detail showing how a flash lamp circuit in the flash holder is normally broken when the holder is not on a camera and is automatically completed when the flash holder is attached to a camera.

Looking now at FIG. 1, a multiple flash holder constructed in accordance with the present invention comprises a housing 11, molded from a plastic material, the lower part of which is recessed to contain the power supply for a flash lamp circuit and which recess is adapted to be caused by a snap on cover 10. While the power supply may be two small batteries, it has been shown here as a BC power pack composed of battery B and a condenser C which are capable of being slipped into metal slips 12 and 13 fixed in the recess. One side of the power supply is connected to contact strap 14 which extends upwardly of the housing and terminates in a stationary contact 15 or 15', see FIGS. 2 and 4, adjacent the aperture in the rear side of the reflector to be engaged by a contact on the lamp sockets carried by the turret as will be fully described hereinafter. The other side of the power supply is connected to terminal 16 which extends to the outside of the flash holder. Also extending from the outside of the flash holder housing in spaced relation with terminal 16 is a threaded terminal 17 which is rotatably and slidably mounted in the wall of the housing and has associated therewith a knurled hand wheel 18 by means of which it can be rotated, see FIG. 3. As is customary, the flash holder is mounted on a camera wall by inserting terminals 16 and 17 thereon into cooperating female terminals on the camera wall which are in turn connected to opposite sides of the flash synchronizer switch associated with the camera shutter. The female terminal in the camera wall which is to cooperate with terminal 17 of the flash holder will, of course, be threaded so that when hand wheel 18 is rotated, the flash holder will be drawn down tight against the camera wall and be positively attached thereto. If desired, and as it customary, a positioning lug 19 may be provided on the flash holder housing in spaced relation with terminal 17 which is adapted to engage the camera wall and properly square the flash holder thereon when wheel 18 is turned to pull the holder down onto the camera body.

Figure 2:
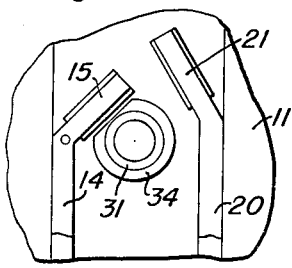
FIG. 2 is an elevational detail of the rear side of the flash holder and showing one arrangement of electrical contacts which are adapted to cooperate with the electrical contacts of the turret to connect the lamp sockets into the flash lamp circuit in succession.
Figure 4:
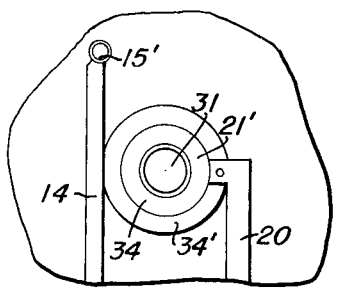
FIG. 4 is a view similar to FIG. 2, but showing another arrangement of electrical contacts adapted for connecting a different form of lamp socket contacts on the turret into the flash lamp circuit in the housing as the lamps are successively indexed into firing position.

The other side of the flash lamp circuit in the flash holder comprises a metal strap 20 which extends from a contact 21 or 21' at the back of the reflector, see FIGS. 2 and 4, and which is adapted to be connected to the other terminal of the lamp sockets in the turret. The other end 22 of metal strap 20 is turned over against the wall of the housing and into a position to be engaged by an enlarged head 23 on the inner end of terminal 17 when the flash holder is attached to the camera and thereby completing the connection of the flash lamp circuit of the flash holder to the synchronizer switch in the camera. A spring finger 24, see FIG. 3, normally engages the inner side of the enlarged head 23 and forces it away from the end 22 of contact strap 20 when the flash holder is disconnected from the camera. This breaks the flash lamp circuit of the flash holder so that when the flash holder is off the camera the lamp circuit cannot be accidentally shorted by laying the same on some metal object which would connect terminals 16 and 17. When the flash holder is attached to a camera and screw terminal 17 is screwed into its cooperating plug on the camera it will be moved axially so that the enlarged head 23 thereon will compress spring finger 24 and be brought into engagement with end 22 of contact strap 20 to complete the lamp circuit.

Fastened in a recessed portion in the top of said flash holder housing 11 is a reflector 25. The thin wall 26 of the housing and the rear wall of the reflector are provided with an opening 27 which is substantially on the optical axis of the reflector and is of sufficient diameter to allow a commercially available miniature flash lamp L to be passed into and out of said reflector from the rear of the flash holder. A plurality of these flash lamps L, in this case six, are mounted in sockets in spaced annular relation in a circular turret 28 which is adapted to be detachably connected to the back of the housing for loading and unloading of the lamps. The turret is so mounted on the housing that it can be moved to and from the housing in a direction parallel to the optical axis of the reflector to insert a lamp into the reflector and pull a burned lamp therefrom and to rotate a new lamp into position for insertion into firing position within the reflector. The details of the turret, the two different types of lamp sockets requiring the two different arrangements of electrical contacts shown in FIGS. 2 and 4, etc., are disclosed in our said Patent No. 2,892,073, mentioned above.

While we have shown and described certain specific embodiments of our invention, we are fully aware that many modifications thereof are possible. Our invention, therefore, is not to be limited to the precise structural details shown and described, but is intended to cover all modifications coming within the scope of the appended claims.

Having now particularly described our invention what we claim is:

1. A portable flash holder comprising a housing, a flash lamp circuit in said housing including a means for supporting a source of potential, a flash lamp socket electrically connected to opposite sides of said lamp circuit and extending from said housing, a pair of terminals adapted to physically engage a cooperating pair of terminals on the outside of a camera body to detachably connect the flash holder to the camera and electrically connect a synchronizing switch in the camera into the lamp circuit, one of said terminals on the housing being movably mounted to move relative to said housing from a normally inoperative position to a switch closing position when the flash holder is attached to the camera, a normally open safety switch in the lamp circuit of said housing to prevent accidental shorting of the lamp circuit when the flash holder is detached from a camera, and including a movable switch contact urged to a switch-open position, and an operable connection between said movable terminal and said movable switch contact for closing said switch when said terminal is moved to its switch closing position upon attachment of said flash holder to a camera.

2. A portable flash holder comprising a housing, a flash lamp circuit in said housing including a means for supporting a source of potential, a flash lamp socket electrically connected to opposite sides of said lamp circuit and extending from said housing, a pair of elongated outwardly extending terminals on said housing adapted to physically engage a cooperating pair of socket terminals on the outside of a camera body to detachably connect the flash holder to the camera and electrically connect a synchronizing switch in the camera into the lamp circuit, one of said terminals being slidably mounted on said housing to move axially relative thereto and into a switch closing position when the flash holder is attached to a camera, a stationary safety switch contact in said housing connected in said lamp circuit, a movable safety switch contact physically and electrically connected to said movable terminal adapted to be moved into circuit closing relation with said stationary switch contact when said movable terminal is moved to said switch closing position, and a spring normally urging said movable terminal from said safety switch closing position when the flash holder is detached from a camera, whereby said safety switch is automatically opened to prevent accidental short circuiting of the lamp circuit by connecting said terminals when the flash holder is detached from a camera.

References Cited in the file of this patent

UNITED STATES PATENTS

| | | |
|---|---|---|
| 2,096,856 | Nuchterlein | Oct. 26, 1937 |
| 2,600,789 | Malone | June 17, 1952 |
| 2,688,071 | Wright | Aug. 31, 1954 |
| 2,911,809 | Nojiri | Nov. 10, 1959 |